United States Patent [19]

Benteler et al.

[11] 3,996,444
[45] Dec. 7, 1976

[54] APPARATUS FOR WELDING ROLLED SEAMS

[75] Inventors: Helmut Benteler, Bielefeld; Franz-Josef Hartmann; Oswald Martens, both of Paderborn; Helmut Schulz, Paderborn-Marienloh, all of Germany

[73] Assignee: Benteler -Werke Aktiengesellschaft Werk Neuhaus, Schloss, Neuhaus, Germany

[22] Filed: Feb. 3, 1975

[21] Appl. No.: 546,823

[30] Foreign Application Priority Data

Feb. 13, 1974 Germany .......................... 2406693

[52] U.S. Cl. ................................. 219/63; 219/84; 219/116; 336/12; 336/184
[51] Int. Cl.² ........................................ B23K 11/24
[58] Field of Search .................... 219/63, 84, 116; 336/12, 184

[56] References Cited

UNITED STATES PATENTS

| | | | |
|---|---|---|---|
| 2,488,628 | 11/1949 | Hoeppner | 336/12 X |
| 3,135,851 | 6/1964 | Hunter | 219/63 |
| 3,273,096 | 9/1966 | Lipshutz | 336/184 X |
| 3,491,223 | 1/1970 | Riley et al. | 219/63 |

*Primary Examiner*—J. V. Truhe
*Assistant Examiner*—N. D. Herkamp
*Attorney, Agent, or Firm*—Michael J. Striker

[57] ABSTRACT

A rotatable shaft has a roller electrode mounted on it for rotation therewith. A transformer and a rectifier are structurally integrated to form a unit which is also mounted on the shaft for rotation with it, and serve to convert high-voltage low-amperage net current into low-voltage high-amperage DC current. Slip rings are mounted on the shaft to transmit electrical current to the unit for supply to the roller electrode.

8 Claims, 3 Drawing Figures

APPARATUS FOR WELDING ROLLED SEAMS

BACKGROUND OF THE INVENTION

The present invention relates generally to a welding apparatus, and more particularly to an apparatus for welding rolled seams by means of a rotating electrode.

It is known to weld rolled seams by means of an electrode roller which rotates, either as the workpiece passes beneath the electrode or as the electrode passes over the workpiece, or both. The welding current that is supplied to the roller electrode is stationarily produced by means of a transformer and subsequently arranged rectifier unit that are connected to a three-phase net supply, and is then transmitted to the rotating electrode roller. The transmission is accomplished by means of slip rings, or else by means of slide or mercury bearings. These prior-art proposals are not entirely satisfactory, and the manner of transmitting current to the roller electrode becomes the more difficult and results in the higher electrical losses, the higher the amperage of the direct welding current is required to be, in order to obtain optimum welding efficiency. In the case of extremely high amperage to be transmitted, the use of slip rings has the disadvantage that a large number of such slip rings is required. The use of slip rings as well as the use of slide bearings both have the disadvantage which is also common to all rotating types of contacts in an electrical system, namely the current transmission is undefined and takes place from point to point, so that a substantial wear develops which drastically reduces the lifetime of the equipment.

In the case of mercury transmission, high losses of current are experienced, and in addition a sealing problem is experienced, and substantial maintenance difficulties exist, which are not least crossed by the potential health hazards resulting from mercury vapors.

Because of the aforementioned drawbacks, the amperage that could be transmitted in this type of equipment was strictly limited, not only for practical but also for economic reasons.

In many instances, however, it is desired to be able to use substantially higher amperage currents for welding operations, than could be transmitted with the prior-art equipment. For example, high-amperage currents in connection with the use of direct current welding current are desired to be used in order to obtain high welding speeds on the order of 100–120 meters per minute and more, while nevertheless obtaining uniform and high-quality welds. This is particularly true in the case of the continuous welding of longitudinal seams in the case of tubes or pipes having a small wall thickness. In order to obtain maximum welding effectiveness, while at the same time also producing high-quality uniform welds, and to be able to do this economically and technically with a reasonable expenditure, direct current is required having extremely high amperage, low voltage and low harmonics. However, this has always encountered great difficulties, since the transmission by means of rotating contacts of welding currents in excess of 100,000 amperes and a few volts may result in transmission losses of up to 50 percent of the total current. Adding to this the additional losses in the rectifier which are approximately of the same order of magnitude, it is clear that economic considerations have very often necessitated the use of lower amperages and consequently to accept the decrease in welding efficiency which results from such lower amperages.

SUMMARY OF THE INVENTION

It is, accordingly, an object of this invention to overcome the disadvantages of the prior art.

More particularly, it is an object of the present invention to provide an improved apparatus for welding rolled seams by means of a rotating electrode, which is not possessed of these disadvantages.

Another object is to provide such an apparatus which makes possible the use of welding currents of high and extremely high amperage and correspondingly low voltage, with simple means which are economical to use.

In keeping with these objects, and with others which will become apparent hereafter, one feature of the invention resides in an apparatus for making rolled seams by means of a rotating electrode, particularly butt-welding of tube seams, having a combination which comprises a rotatable shaft, a roller electrode mounted on the shaft for rotation therewith, a transformer and a rectifier structurally integrated to form a unit and being mounted on the shaft for rotation therewith, for converting high-voltage low-amperage net current into low-voltage high-amperage DC current, and slip rings mounted on the shaft for transmitting electrical current to the unit for supply to the roller electrode.

This arrangement eliminates the disadvantages of the prior art. It not only avoids the problem of high amperage current transmission at the secondary side, but for the first time at all makes it possible to supply direct current welding currents of such high amperage as is desired to be used but heretofore was impossible to be used, at least for economic if not technical reasons.

It is desirable that the transformer and rectifier unit be compact and as fully integrated structurally as possible. For this purpose it is advantageous if at the primary side it is supplied by the slip rings with three-phase current and if the transformer unit is composed of three rotationally symmetrically arranged single-phase transformers which are arranged in a delta shape relative to one another as well as to the axis of rotation. Furthermore, it is desirable to use for the rectifiers which are arranged at the secondary side, diodes which according to a currently preferred embodiment of the invention are directly mounted on busbars which are associated with one terminal of the secondary windings.

In this manner the dimensions as well as the moment of inertia of the integrated transformer and rectifier unit can be maintained within narrow limits, as is particularly desired if the electrode roller itself is not directly driven, but instead is taken along by friction with the workpiece which travels at relatively high speed and in contact with the electrode roller.

The secondary windings of each single-phase transformer are advantageously composed of several surround windings whose two terminals extend radially outwardly away from the axis of rotation. This makes possible the use of center busbars immediately on the respective outwardly directed terminals of the individual windings of each transformer leg, and therefore result in a further structural simplification and compact construction.

The single-phase transformers advantageously have generally rectangular or frame-shape cores and each leg carries a primary winding and several secondary surround windings each, of which the latter surround the former. The separation of the secondary winding into several separate surround windings has the substantial advantage that the resistances are uniform everywhere and a more uniform current distribution to the diodes is obtained.

The electrical arrangement of the secondary side can in principle be selected at will, but a particularly advantageous embodiment of the invention proposes to connect the surround windings of the three single-phase transformers in a six-branch circuit using a minimum number of rectifiers or diodes.

An advantageous embodiment provides each transformer leg with two pairwise arranged surround windings which are connected to a rectifier circuit, and to connect the center points of all pairs of windings via the center busbar that is fixedly arranged between the respective terminals of the surround windings, with the central point that is common to all transformer legs. The alternately opposite connection of the surround windings which are arranged to follow one another on each transformer leg, with the center busbar located between the terminals, has the advantage that the transformer legs are more uniformly loaded electrically. In addition, it has the further advantage that the diode groups associated with the respective surround windings have more room for their accommodation.

A particularly compact construction can be obtained in that the regular busbars and the center busbars are supported at their ends by supporting spokes on the shaft or on a supporting tube which surrounds the shaft and is fixedly connected with the same, the spokes which face the electrode roller being connected to collective terminals which are insulated from one another and which in turn constitute the DC connection for the two electrodes on the roller which are insulated from one another.

It is advantageous if the regular busbars, the center busbars and the electrode roller are internally cooled in known manner, for instance by means of water.

The arrangement according to the present invention has, among its other advantages that have been outlined before, the further advantage that it is particularly small in dimensions, that it is very simple in construction, and that it offers optimum current utilization since the current paths are very short and the losses are therefore reduced to a minimum.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
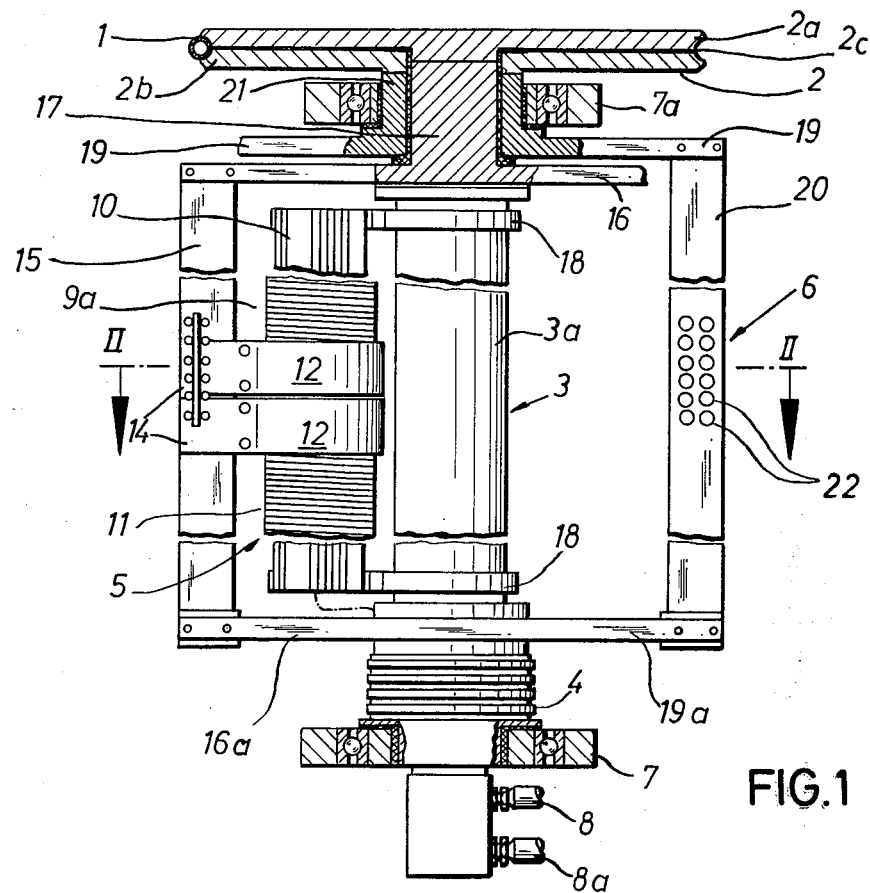
FIG. 1 is a somewhat diagrammatic axial section through an arrangement according to the present invention.

The exemplary illustrated embodiment serves for the continuous welding of longitudinally extending tube seams on metal and steel tubes 1. Of course, it would be applicable for other uses also. In any case, however, it serves to effect welding by means of direct current of high amperage and low harmonics which is continuously supplied to the tube 1 via the rotating electrode roller 2. The electrode roller 2 may be separately driven, or it may be driven in rotation by frictional engagement with the advancing tube 1. The roller 2 is subdivided and has two counter-polar sections 2a and 2b that are insulated electrically from one another and at the same time connected with one another for joint rotation, by means of an intermediate layer 2c.

Basically speaking, the arrangement has a shaft 3 on which the electrode roller 2 is mounted for rotation with the shaft 3. At the end of the shaft 3 remote from the electrode roller 2 the shaft carries slip rings 4 which are also mounted on the shaft 3 for rotation with the same. In addition, and in accordance with the invention, there is provided a structurally compact unit composed of a transformer 5 and rectifier 6. At opposite ends of the shaft 3, the shaft 3 is freely rotatably journalled by means of respective roller bearings 7, 7a. Reference numeral 8 identifies a cooling water supply located at one end of the shaft 3, and reference numeral 8a identifies the discharge for the cooling water at the same end of the shaft.

Figure 2:
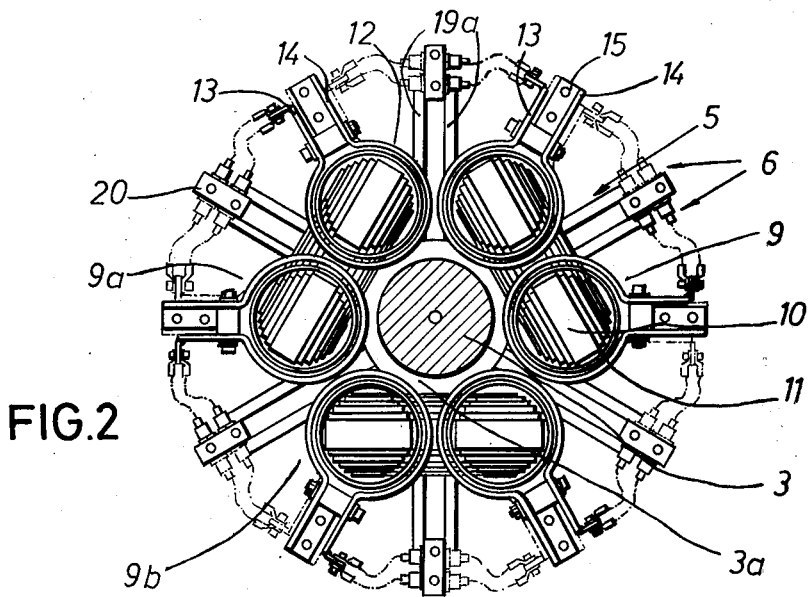
FIG. 2 is a section taken on line II—II of FIG. 1.

Reference to the drawing will show, especially in FIG. 2, that the transformer unit 5 is composed of three single-phase transformers 9, 9a and 9b which are mounted rotationally symmetrically relative to the axis of rotation. Each of the transformers 9, 9a and 9b has a core 10 which may be of transformer sheet metal and is frame-shaped in its configuration, i.e. the core 10 has a closed, generally rectangular configuration. On each of its two legs the core 10 is provided with a primary winding having a plurality of windings 11 and with a secondary winding comprised of several surround windings 12 which exteriorly surround the windings 11 and which have two terminals 13 and 14 that extend radially outwardly from the axis of rotation. Located between the terminals 13 and 14, and connected with the longer terminals 14 in a fixed and conductive manner, there are arranged center busbars 15 which extend parallel to the axis of rotation and which are interiorly cooled by the cooling water supplied through the inlet 8 and discharged through the outlet 8a. These center busbars 15 are supported at their longitudinally spaced ends by spokes 16 and 16a which further serve to connect them with the shaft 3 for rotation with the same. The spokes 16a which face towards the slip rings 4 are electrically insulated with reference to the center busbars 15; the other spokes 16 serve to electrically connect the center busbars 15 to the center point which is common to all center busbars 15 and constitutes the contact 17 for the outer electrode 2a of the electrode roller 2.

Figure 3:
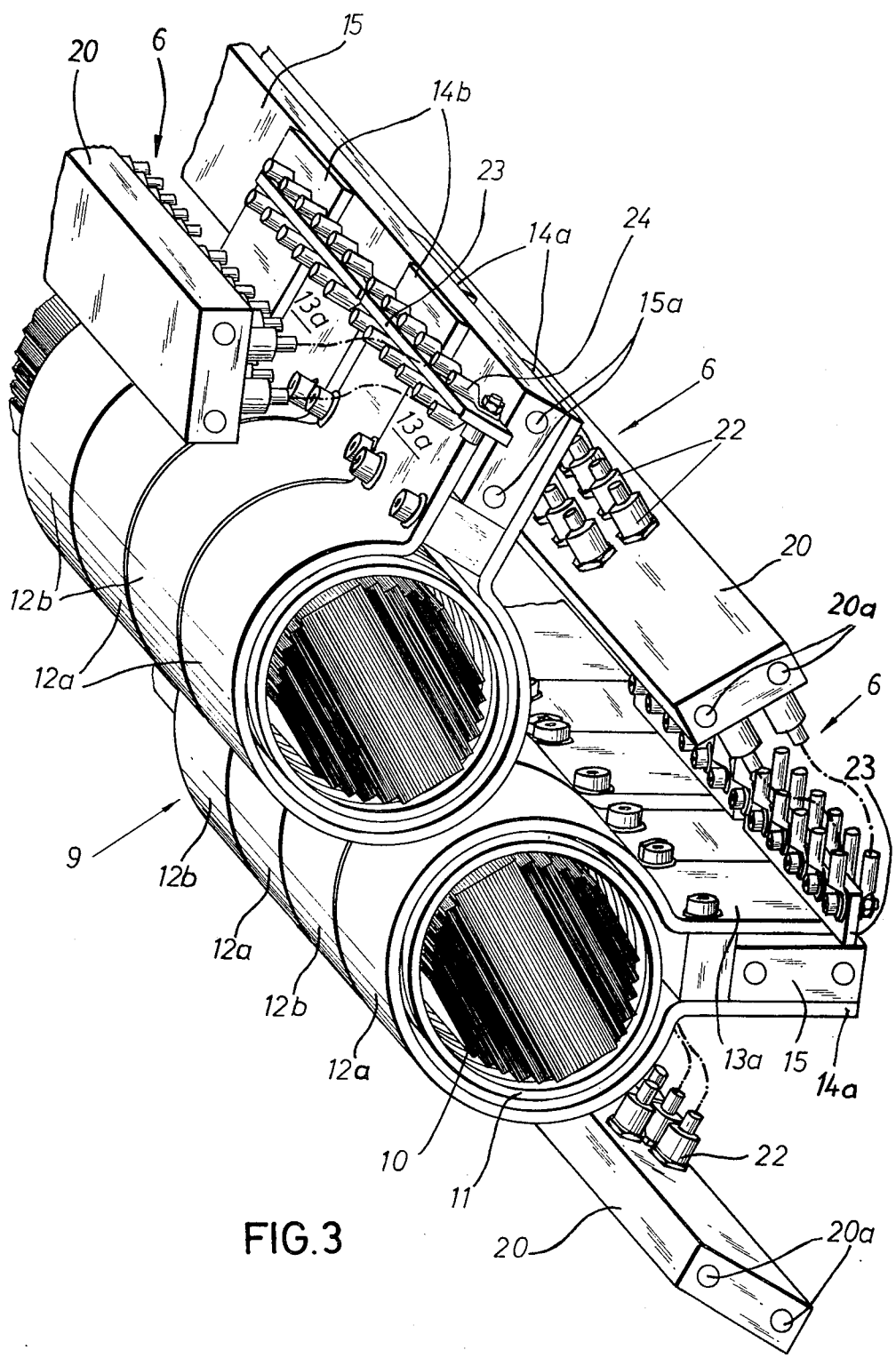
FIG. 3 is a perspective view, showing a detail of the arrangement in FIGS. 1 and 2.

In this manner, the surround windings 12 of the secondary winding are connected to the shaft 3 primarily via their connection with the center busbars 15. The transformer cores with their primary windings 11 are supported by holding members 18 which are firmly fixedly mounted on the shaft 3 or on a tube 3a which surrounds the shaft 3 and is connected to the same for rotation therewith. This is shown in FIG. 1. Further supporting spokes 19 and 19a are provided between the terminals 13 and 14 of the windings 12, being symmetrically offset relative to the same in direction of rotation (see FIG. 2). These spokes 19 and 19a carry further busbars 20 which extend parallel to the axis of rotation and through which cooling water flows. The spokes 19a facing towards the slip ring 4 are again electrically insulated from the busbars 20 with which they are connected; whereas the spokes 19 which face towards the roller electrode serve to supply current to the collecting point 21 which in turn constitutes the contact for the other electrode 2b of the roller electrode 2. FIG. 3 shows further details of the various connections, and also indicates that, as already shown in FIGS. 1 and 2, the busbars 20 have mounted directly on them the diodes 22 which are connected with the windings 12 to form the rectifier unit 6. FIG. 3 shows in an enlarged perspective view the single-phase transformer 9 of FIGS. 1 and 2, and the manner in which its secondary windings 12 are connected to the center busbar 15 on the one hand, and (mediately via the diodes 22) to the busbar 20. FIG. 3 shows that each transformer leg has mounted on it two pairwise arranged surround windings 12a and 12b which are connected to a rectifier circuit, and whose center points are connected via one another via the center busbar 15 that is located between the respective terminals 13 and 14 and is fixedly and conductively connected to the respective longer terminals 15. The center busbars 14 in turn are connected to the common point 17 via the spokes 16. The long terminals 14a of the windings 12a are connected from below with the center busbar 15 in an electrically conductive arrangement; the long terminals 14b of the subsequently following windings 12b are connected from above in conductive relationship with the center busbars 15. The upper shorter terminals 13a of the windings 12a are connected to a contact member 23 in the region above the center busbar 15, which carries the cable shoes 24 for the cable connection to the diode group of that busbar 12 which is arranged circumferentially following the respective member 23.

The shorter terminals 13b of the windings 12b are not visible in the drawing, but should be understood to be conductively connected with their further contact member 23 at the opposite side of the center busbar 15, which member 23 in turn carries the cable shoes for the cable connection to the associated diode groups on that busbar which is located circumferentially spaced in clockwise direction beneath the contact member 23. In this manner the contact members 23 can be made substantially longer than corresponds to the actual width of the terminals 13 of the windings 12. For the same reason this alternately offset arrangement offers more space for the diodes 22 on the busbars 20, since the diode groups are always arranged at opposite sides, as shown in FIG. 3. Reference numerals 15a and 20a identify cooling fluid channels, for instance bores, provided in the various busbars, via which the same receive cooling water from a central cooling supply.

The four slip rings of the member 4 contact the three phase wires and the zero conductor of the three-phase net which supplies low-amperage high-voltage current; from there, this current is supplies to the primary windings of the three single-phase transformers 9, 9a and 9b. The rectified currents are combined downstream of the rectifiers to form a direct current of very high amperage, for example far in excess of 100,000 amperes, but very low voltage of only a few volts, which is then supplied to the two electrodes 2a and 2b. The arrangement according to the present invention produces a direct current having particularly low harmonics, low voltage but very high amperage, such as is required to be able to operate at high welding speeds and in order to obtain high-quality uniform welded seams.

It will be understood that each of the elements described above, or two or more together, may also find a useful application in other types of constructions differing from the types described above.

While the invention has been illustrated and described as embodied in a welding apparatus having a roller electrode, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an apparatus for welding rolled seams, particularly for butt-welding of tube seams, a combination comprising a rotatable shaft having an axis of rotation; a roller electrode having two electrode sections mounted on said shaft for rotation therewith; slip rings also mounted on said shaft; transformer means having a primary and a secondary side for converting high-voltage low-amperage net current into low-voltage high-amperage net current, comprising three single-phase transformers each having a closed core formed with axially extending legs and being arranged about said shaft in a rotationally symmetrical configuration with respect to said axis of rotation, each primary side of a respective transformer having a primary winding which is carried by said legs and which is electrically connected with one of said slip rings at which it receives electrical net current, and each secondary side of a respective transformer having a secondary winding comprised of a plurality of surround windings successively arranged in pairs longitudinally of said legs and surrounding said primary winding carried by said legs, each surround winding having a pair of outer terminals extending in direction radially outwardly from said axis of rotation; a plurality of first axially extending busbars spaced circumferentially about said axis of rotation and having opposite sides which are mounted between said pairs of outer terminals, one of said outer terminals of each successive pair alternately contacting said opposite sides so as to uniformly collect the electrical current over the length of said first busbars and conduct the collected electrical current of all of the first busbars to a first common collecting point which is electrically connected to one of said electrode sections, the other one of said outer terminals of each successive pair being alternately electrically connected with contact members provided on said opposite sides of said first busbars; a plurality of second axially extending busbars also spaced circumferentially about said axis of rotation intermediate said first busbars; and rectifying means for converting electrical net current into DC current, comprising a plurality of diodes mounted on opposite sides of each of said second busbars and being electrically connected with said contact members so as to conduct the electrical current supplied to the contact members by said second busbars to a second common collecting point which is electrically connected to the other of said electrode sections, whereby welding currents of high DC amperage are supplied to the roller electrode.

2. An apparatus as defined in claim 1, wherein said closed core has a generally rectangular configuration.

3. An apparatus as defined in claim 1; and further comprising cooling channels formed in the interior of each of said first and second busbars.

4. An apparatus as defined in claim 1; and further comprising means for mounting said first and second busbars on said shaft in circumferential direction thereof, said mounting means comprising radially-extending spokes supporting said first and second busbars at the ends of the busbars.

5. An apparatus as defined in claim 4, wherein at least one of said spokes which support each of said first and second busbars are electrically conductive and respectively connect said first and second busbars to said electrode sections which are electrically insulated from one another.

6. An apparatus as defined in claim 1; and further comprising a sleeve coaxially surrounding said shaft and mounted for rotation therewith; and further comprising means for mounting said core on said sleeve.

7. An apparatus as defined rolled seams, particularly for butt-welding of tube seams, a combination 1, wherein said diodes are arranged in groups, one of said groups being mounted at a respective one of said sides of said second busbars, and the other one of said groups being mounted at the other side of the respective second busbars.

8. In an apparatus for welding rolled seams, particularly for butt-welding of tube seams, a combination comprising a rotatable shaft having an axis of rotation; a roller electrode having two electrode sections mounted on said shaft for rotation therewith; slip rings also mounted on said shaft; transformer means for converting high-voltage low-amperage net current into low-voltage high-amperage net current, comprising three single-phase transformers each having a primary winding which is electrically connected with said slip rings and which is wound about an axially extending core, and a secondary winding comprised of a plurality of surround windings which are successively arranged in pairs which surround said primary winding in axial direction, each surround winding having a pair of outer terminals; a plurality of first axially extending busbars spaced circumferentially about said axis of rotation, one of said outer terminals being electrically connected with said first busbars so as to collect electrical current for distribution to a first common collecting point which is connected to one of said electrode sections; a plurality of second axially extending busbars also spaced circumferentially about said axis of rotation intermediate said first busbars; and rectifying means for converting electrical net current into DC current, comprising a plurality of diodes mounted on said second busbars and electrically connected with the other of said outer terminals so as to collect electrical current for distribution to a second common collecting point which is connected to the other of said electrode sections, whereby welding currents of high DC amperage are supplied to the roller electrode.

* * * * *